United States Patent Office 2,787,480
Patented Apr. 2, 1957

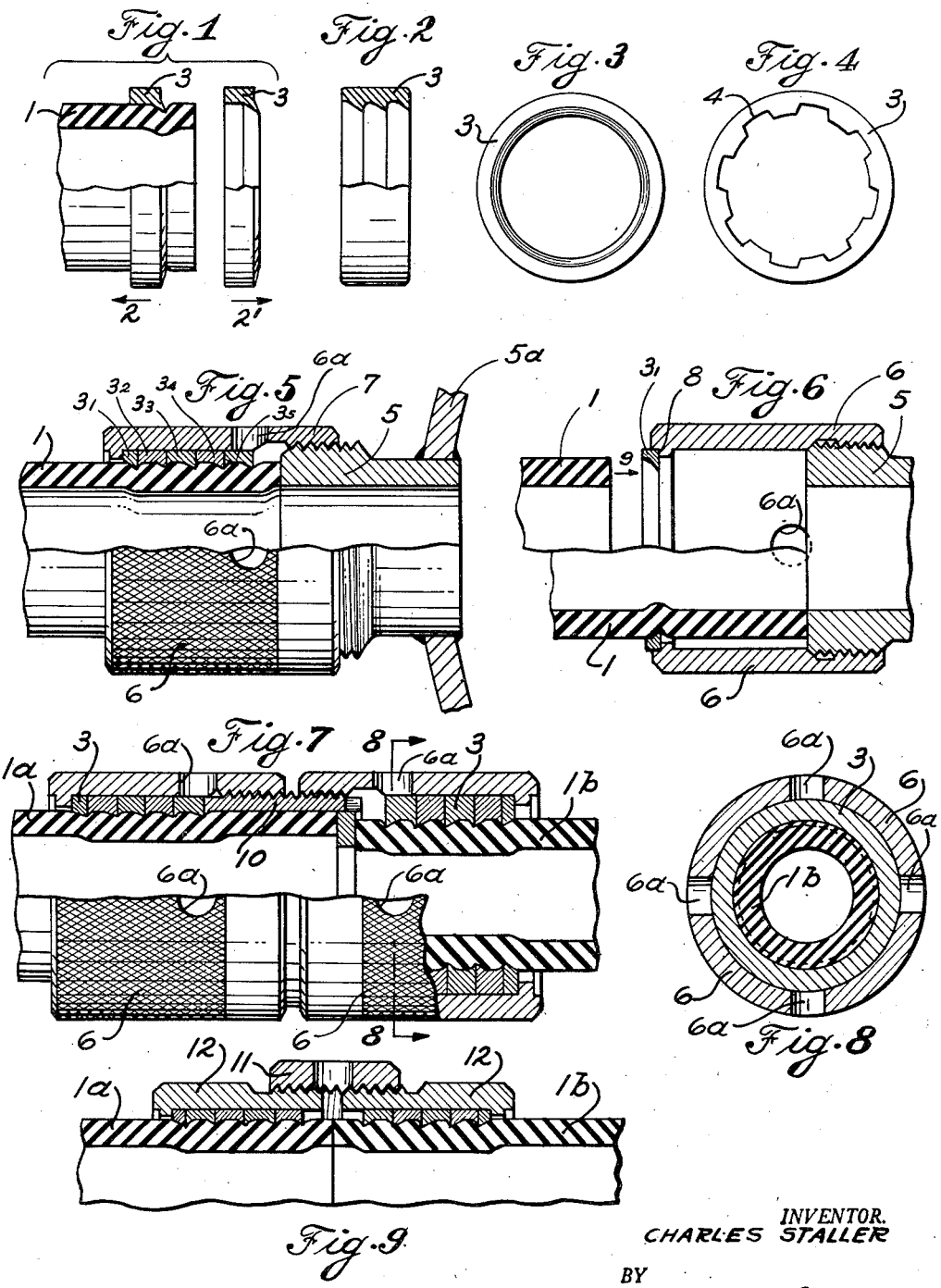

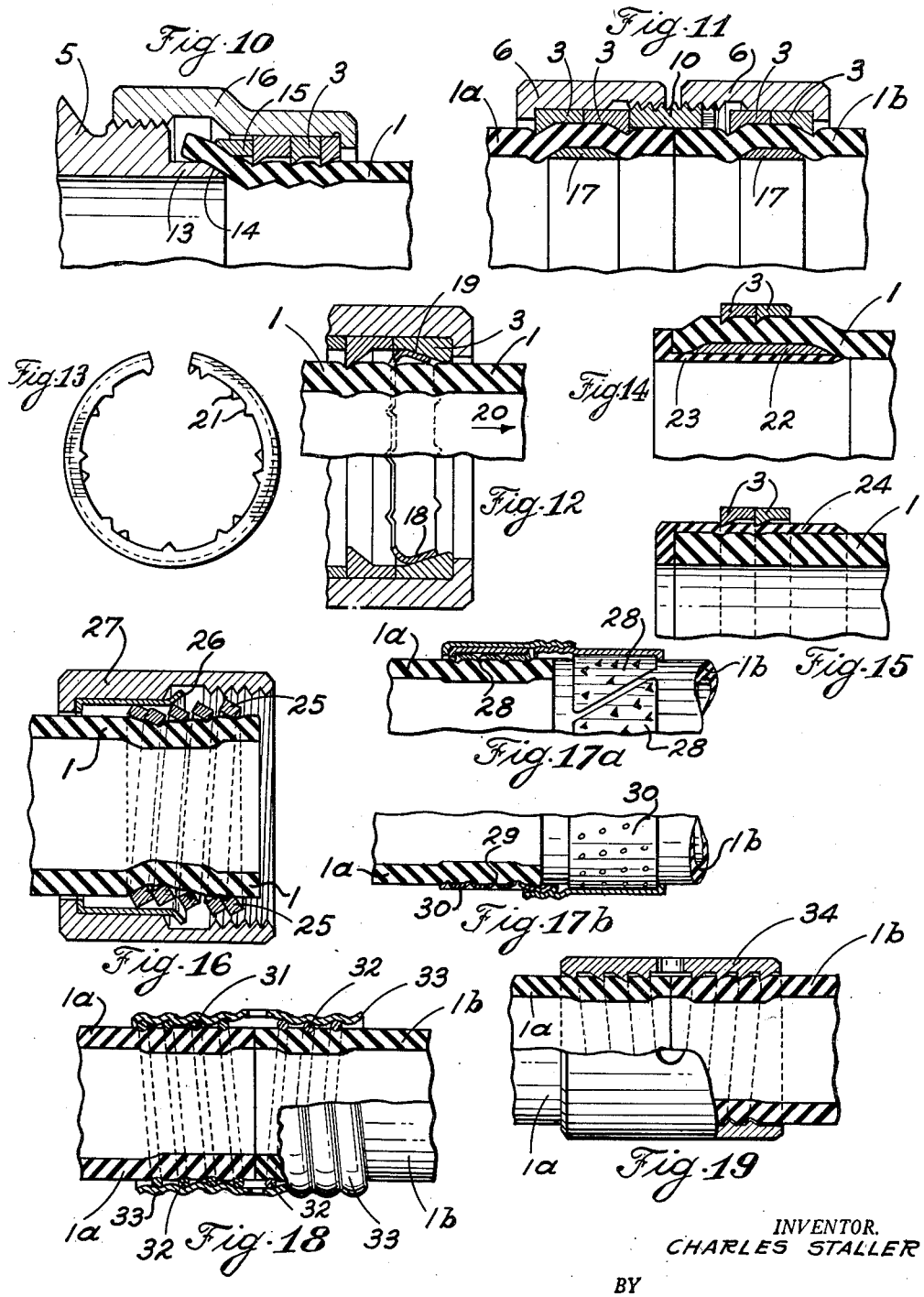

2,787,480

THIMBLE TYPE HOSE COUPLING WITH PLURAL GRIPPING RINGS

Charles Staller, Canton, Ohio

Application March 18, 1952, Serial No. 277,250

1 Claim. (Cl. 285—238)

The aim of the present invention is to remove the objectionable features of the couplings that are now in use in breweries, soft drink plants, dairies etc. Of the couplings heretofore used none is free from serious defects. The connecting metal part which is inserted into the hose has a considerably smaller inside diameter than the hose and thus an increased hydraulic resistance to the liquid passing through the hose is created.

Furthermore it is virtually impossible to eliminate areas that can be cleaned only with great difficulties, if at all. These areas are liable to become centers from which contamination will spread.

In order to fasten the hose securely to the coupling, some means (wire, clamp etc.) must be employed and inevitably the hose suffers under the pressure of the wire and will deteriorate prematurely. Since the coupling is placed inside the hose a pressure inside the hose will tend to stretch the hose, destroy the seal between the hose and the coupling, thus inviting leaks.

The present invention removes all these defects of conventional couplings. According to this invention, a hose which has a flat face at its end (as it is customary in hoses made for breweries, dairies etc.) is held by clamping elements provided externally of the hose. The face of the hose is pressed firmly against the face of tank counterpiece or directly against the face of another hose. The face of the coupling may be so shaped as to achieve the maximum tightness consistent with the texture and design of the hose. Consequently there is no need of some inner part, such as is used in conventional couplings. Thus the useful diameter of the hose is not objectionably reduced. There are no dangerous cavities nor inaccessible areas. With increase of pressure inside the hose, the resistance of the hose against disconnection from the coupling increases.

The special design of the coupling results in a strong grip on the outside of the hose. There is at least one, but preferably plural rings having an inside diameter slightly smaller than the outside diameter of the hose. The ring or rings are placed on the outside of the hose near its end. The profile of the ring, or rings resembles a saw-tooth, its wedge so inclined as to permit an easy montage on the hose, but to produce a maximum resistance against pulling the hose out of the coupling, yet at the same time preventing any damage to the hose.

The inside edges of the rings may have a number of slots. Each ring is to be placed over the end of the hose individually. This permits to make the inside diameter of the rings noticeably smaller than the outside diameter of the hose. A considerable force would be required to pull the rings off the hose simultaneously. Yet it will remain easy to place and also to remove the rings one by one. This is of particular importance when larger sizes of hoses (2" dia. and up) are to be connected.

The rings will exert an equal pressure along the circumferential contacting lines against the hose. Liquid pressure inside the hose will press the hose against the wedge shaped inside of the rings, the elastic hose will fill out the spaces inside all the rings and this will create a formidable resistance against the attempt of pulling the hose out of the coupling.

The number of rings is not limited. For normal operations in breweries, dairies etc. it is sufficient to employ as many rings as will—in their aggregate length—approximately equal the diameter of the hose.

The pressure inside the hose will deform the elastic hose and force it to assume the inside shape of the rings. The hose will then show asymmetrical waves, which will considerably add to the resistance preventing the hose from being pulled out of the coupling.

The rings which were slipped over the hose constitute the coupling element gripping the hose. Every point of contact between the hose and the rings is used to increase the resistance against a disconnection of the hose. This is done in a way perfectly symmetrical to the hose-axis and over the entire surface of contact.

The coefficient of friction of rubber on metal surface would be considerably reduced if some liquid penetrated between the two surfaces. In conventional couplings the pressure in the line will press the liquid between the contacting surface whereas in a coupling of my design an increase of pressure in the line will increase the contacting force between the hose and the ring edges.

As indicated, the rings may have screw-shaped edges or they may be replaced by a spring made of wire of suitable profile. In such a case, the outside shape of the spring profile may serve as thread of the coupling nut, which may be either of one or two parts.

The outside part of the rings has a cylindrical shape. A coupling nut with or without an inserted linking member engages the outside edge of the ring unit in order to press the face of the hose axially and to seal it. In case of special types of hose walls, soft suitably shaped rubber rings may be placed between the face of the hose and the face of the coupling.

The inside diameters of the rings are dimensioned to fit the outside diameters of standard hoses with due consideration to production tolerances. It being quite inexpensive to make the rings, a supply of spare rings of stepped-down diameters to cover a wide margin of such deviations from standard size may be kept on hand. The dimensions of the remaining parts of the coupling are determined by the outside diameter of the rings. The outside diameter of the rings should preferably be limited to a few suitably selected dimensions, as this will permit to reduce considerably the number of various sizes of couplings required to cover a wide range of various diameters of hoses.

The coupling may be provided with a small recess on its back face which will facilitate the proper spacing of the first ring.

As mentioned above, the clamping forces are created through the elasticity of the hose walls and through the pressure from the inside of the hose and from the corrugations of the hose near the ends. In case of a special design of hoses, this may not be sufficient and in such a case the hose walls may be reinforced by means of a thin metal insert. This insert can be covered by a rubber sleeve, vulcanized on both ends of the hose, in order to prevent a contact between the metal insert and the liquid in the hose. One end could be vulcanized to the face of the hose.

The following figures show several designs incorporating the features of my invention:

Fig. 1, an axial cut of a simple, single ring,
Fig. 2, an axial cut of a ring with multiple circular ridges,
Fig. 3, front view of rings shown in Figs. 1 and 2,
Fig. 4, front view of a ring provided with slots, Fig. 5, a partial cut featuring the clamping and the coupling device, Fig. 6, the coupling shown in Fig. 5 in the moment when the first ring is placed on the hose, Fig. 7, a coupling joining two hoses of different diameters, Fig. 8, a cut along lines 8—8 of Fig. 7, Fig. 9, a coupling of two hoses of the same diameter using externally threaded caps, Fig. 10, a coupling joining a thin soft hose by means of a support, Fig. 11, a coupling joining two soft hoses, featuring inside supports, Fig. 12, a coupling featuring an additional retaining ring, Fig. 13, front view of the retaining ring, Fig. 14, axial cut of a special design with internal support, Fig. 15, axial cut of a special design, with soft rubber outside layer, Fig. 16, a coupling featuring a helical spring in place of rings, Fig. 17a, a coupling with split rings, made from sheet metal, Fig. 17b, a coupling with solid rings, one of them being used as coupling member, Figs. 18 and 19, two alternative designs featuring the clamping unit serving simultaneously as coupling unit.

The basic idea of my invention is shown on Fig. 1. Ring 3 is slipped on hose 1 in the direction of arrow 2. Ring 3 has a profile resembling a saw-tooth with the wedge inclined towards direction 2'. This shape permits ring 3 to slip with a relatively small resistance over hose 1. However a considerable resistance will be met if ring 3 is pushed in direction 2', because its edge will have a tendency to bite into the surface of the hose and thus a dry friction between the ring and the hose is assured. Obviously the wedge must not be made so sharp as to actually cut into the body of the hose.

A variation design shown on Fig. 4 differs from design shown on Fig. 3 by having the edge provided with several slots 4.

Fig. 5 shows a coupling connecting hose 1 to plug 5 of tank 5a. In place of the simple ring 3 with multiple wedges as shown on Fig. 2, there are several rings $3_1$ to $3_5$. These rings are individually slipped on the hose in the direction of arrow 2. The first ring $3_1$ leans against coupling nut 6 which at 7 is connected to plug 5 by a thread. As coupling nut 6 which has a plurality of circumferentially spaced bores 6a adaptable to receive and engage lugs of a suitable tool for tightening or loosening the same is screwed on plug 5 the face of hose 1 is tightly pressed in axial direction against the face of plug 5.

Fig. 6 explains the montage of the rings. Coupling nut 6 is shown fully screwed on plug 5. On the front end of coupling nut 6 is a recess 8 in which ring $3_1$ is placed. Now hose 1 is pushed in the direction of arrow 9 into the coupling nut 6 until it reaches the face of plug 5. In this manner the correct location of the first ring $3_1$ on hose 1 is established. The remaining rings are then individually placed on hose 1 in the same manner as ring $3_1$, i. e. by placing each ring in recess 8. The first ring $3_1$ serves as a stop for placing the following rings.

Fig. 7 shows how two hoses 1a and 1b are joined. A set of rings 3 is placed on both hoses. The wedges of these sets of rings point in opposite direction. Each set of rings is held by a coupling nut 6. Both are screwed on a connecting member 10. By turning one or both coupling nuts 6 the faces of the two hoses will be tightly pressed against each other in an axial direction. In the example shown on Fig. 7, two hoses of different diameter are coupled together by two coupling nuts of the same size. To overcome the difference in the diameter of the two hoses, the sets of rings have a correspondingly different thickness.

Fig. 9 shows a variation of design shown on Fig. 7. In place of connecting part 10, which in the design shown on Fig. 7 was placed inside of the coupling nuts, in this variation the connecting unit 11 is placed on the outside of the two coupling nuts.

Another variation shown on Fig. 10 connects a soft-walled hose 1 with plug 5, which has a thin extension 13 with a tapered end 14. Hose 1 is pulled over extension 13, and ring 15 with a correspondingly tapered inside diameter holds the hose against the tapered part 14 of extension 13. This design also features several wedge-shaped rings 3, and a coupling nut 16.

Fig. 11 shows another variation of design, coupling two thin-walled hoses. Over each hose a pair of rings 3 has been placed, the thin walls of both rings facing each other in each pair. Inside the soft-walled hose 1a and 1b are placed inserts 17, made for example of bronze or brass, tapering toward both ends. Their tapering corresponds to the inside taper of the rings and also the length of the insert corresponds to the combined lengths of the two rings, so that the hose is held with an even firmness between the pair of rings and the insert. (The assembly of this unit is accomplished in a similar manner as shown on Fig. 7.)

In the variation of the design shown on Figs. 12 and 13, an elastic ring 18 is placed between the last ring 3 and hose 1. The moment the hose 1 is pulled in direction 20, the elastic ring 18 will be closed by being pushed against the tapered inside of ring 3, the diameter of ring 18 will be decreased and its grip on hose 1 will become stronger. To increase this effect ring 18 may be provided with gripping points 21 which will dig into hose 1. The purpose of this design is to prevent a disconnection of the hose from the coupling even if the hose should be pulled in a manner causing a decrease in the diameter of the hose.

Fig. 14 shows how rings 3 may be placed over hose that has extremely soft walls. Hose 1 is reinforced by means of an insert 22, which is covered by vulcanized rubber coating 23.

Design shown in Fig. 15 aims at a similar purpose.. However in this variation of design a vulcanized or glued on reinforcing coating is placed on the outside of the hose. This design variation will be suitable for coupling of hoses with extremely smooth or hard walls. The reinforcing unit must be made of material having the desired elasticity.

Fig. 16 shows a variation of design in which in place of the individual rings the gripping action is achieved by a helical spring 25, whose edges are pressing against hose 1. If desired the gripping action may be considerably intensified by placing a sleeve 26 inside the coupling nut 27 in order to press the spring further into the hose. It is, of course, possible to arrange that the radial pressure towards the center of the hose be exerted by the sleeve 26 only. Obviously it is possible to join hoses of various diameters with the same tubular spring by changing the sleeves and selecting simply the proper size of sleeve. In place of one helical spring 25 a number of elastic single rings may be used.

In Figs. 17a and 17b an alternative coupling made from sheet metal is shown. The clamping is performed by a tubular ring 28 or 30 pierced on several places from outside. These gripping points 29 or corrugations can be made after the ring 30 is shifted over the hose end, thus fixing the ring permanently (Fig. 17b). If a removable ring is desired for cleaning or sanitary purposes, a split ring 28 can be used as shown in Fig. 17a.

Fig. 18 shows two hoses 1a and 1b clamped by means of helical springs 31 and 32 which are wound in opposite directions or with different pitches. These helical springs also serve as threads for the common coupling unit 33.

It is not necessary that the spring is provided with a wedge shaped rim. It may be quite adequate, under circumstances, to make the inner surface of the spring suitably rough.

Fig. 20 shows another variation of design. In this instance the coupling unit 34 is provided in its inside with threads of opposite direction or of different pitch, and hoses 1a and 1b are coupled by turning the coupling unit 34 so that the thread will force the ends of both hoses together.

I claim:

A hose coupling comprising a sleeve surrounding and spaced from a hose and having an inwardly extending shoulder adjacent one end thereof, a plurality of solid, circumferentially continuously rings in said space, each having an internal surface having a diameter on the side toward said shoulder substantially that of the outer diameter of said hose and having at least a portion thereof tapering to an inwardly directed edge axially removed from said side of internal diameter less than the external diameter of said hose and an external diameter less than the internal diameter of said sleeve, means engaging the axial end of the hose and secured to said sleeve and maintaining said shoulder and rings in forced axial engagement and said hose in sealing assembled relation with said means whereby said rings may be readily inserted one at a time on said hose and simultaneously resist disengagement of said hose from within said sleeve.

References Cited in the file of this patent

UNITED STATES PATENTS

| | | |
|---|---|---|
| 87,993 | Weston | Mar. 16, 1869 |
| 1,934,022 | Wiggins | Nov. 7, 1933 |
| 2,116,299 | Bannister | May 3, 1938 |
| 2,147,354 | Scholtes | Feb. 14, 1939 |
| 2,444,380 | Shimek | June 29, 1948 |
| 2,460,653 | Raybould | Feb. 1, 1949 |
| 2,474,880 | Woodling | July 5, 1949 |
| 2,479,683 | Hufferd | Aug. 23, 1949 |
| 2,536,354 | Cowles | Jan. 2, 1951 |
| 2,570,224 | Fason | Oct. 9, 1951 |
| 2,585,453 | Gallagher | Feb. 5, 1952 |
| 2,707,116 | Hardwick | Apr. 26, 1955 |

FOREIGN PATENTS

| | | |
|---|---|---|
| 51,558 | France | Feb. 5, 1943 |
| 705,373 | Great Britain | Mar. 10, 1954 |